US009261986B2

(12) United States Patent
Kumazawa et al.

(10) Patent No.: US 9,261,986 B2
(45) Date of Patent: Feb. 16, 2016

(54) TRACKBALL DEVICE AND ULTRASONIC DIAGNOSTIC APPARATUS

(75) Inventors: Takashi Kumazawa, Otawara (JP); Shinichiro Kikuchi, Otawara (JP); Shingo Higashiyama, Hachinohe (JP)

(73) Assignees: Toshiba Medical Systems Corporation, Otawara-shi (JP); Tamagawa Seiki Co., Ltd., Iida-shi (JP)

( * ) Notice: Subject to any disclaimer, the term of this patent is extended or adjusted under 35 U.S.C. 154(b) by 569 days.

(21) Appl. No.: 13/074,436

(22) Filed: Mar. 29, 2011

(65) Prior Publication Data
US 2011/0241994 A1 Oct. 6, 2011

(30) Foreign Application Priority Data

Mar. 30, 2010 (JP) .................................. 2010-078802

(51) Int. Cl.
*G06F 3/0354* (2013.01)
*G06F 3/038* (2013.01)

(52) U.S. Cl.
CPC ............ *G06F 3/03549* (2013.01); *G06F 3/038* (2013.01)

(58) Field of Classification Search
CPC ... G06F 3/038; G06F 3/0338; G06F 3/03543; G06F 1/169; G06F 3/0362; G06F 3/0383; G06F 2203/0333; G06F 3/03549; G06F 3/0312; G05G 9/047; G05G 2009/0474
USPC .......................... 345/163–167, 156; 348/211; 463/37–38; 250/221
See application file for complete search history.

(56) References Cited

U.S. PATENT DOCUMENTS

| 5,404,152 | A | * | 4/1995 | Nagai ........................... 345/157 |
| 5,486,845 | A | * | 1/1996 | Chait ............................ 345/163 |
| 5,561,445 | A | * | 10/1996 | Miwa et al. ................... 345/163 |
| 5,565,891 | A | * | 10/1996 | Armstrong .................... 345/167 |
| 5,896,124 | A | * | 4/1999 | Strandberg .................... 345/163 |

(Continued)

FOREIGN PATENT DOCUMENTS

| CN | 2198653 Y | 5/1995 |
| CN | 2672750 Y | 1/2005 |

(Continued)

OTHER PUBLICATIONS

Japanese Office Action issued Aug. 6, 2013, in Japan Patent Application No. 2010-078802 (with English translation).

(Continued)

*Primary Examiner* — Md Saiful A Siddiqui
(74) *Attorney, Agent, or Firm* — Oblon, McClelland, Maier & Neustadt, L.L.P.

(57) ABSTRACT

According to one embodiment, there is provided a trackball device provided for an operation panel of a predetermined computer, the device includes a first casing including a housing portion, a ball rotatably housed in the housing portion, a detector provided in the housing portion and configured to detect input information based on rotation of the ball, and a second casing including an opening portion and mounted on the first casing to restrain the ball in the housing portion while part of the ball is exposed from the opening portion, wherein the second casing further comprises a ring portion which is provided along the opening portion and exposed from the operation panel when the trackball device is provided on the operation panel, and is configured to be detachable from the first casing upon application of a dynamic action to the ring portion.

30 Claims, 13 Drawing Sheets

(56) References Cited

U.S. PATENT DOCUMENTS

| | | | |
|---|---|---|---|
| 6,402,616 B1* | 6/2002 | Ogata et al. | 463/37 |
| 6,525,714 B1* | 2/2003 | Varga et al. | 345/164 |
| 2002/0109674 A1* | 8/2002 | Tada et al. | 345/167 |
| 2004/0021638 A1* | 2/2004 | Kaizaki et al. | 345/167 |
| 2007/0216645 A1* | 9/2007 | Hsu | 345/161 |

FOREIGN PATENT DOCUMENTS

| | | |
|---|---|---|
| CN | 1912812 A | 2/2007 |
| CN | 101120892 A | 2/2008 |
| CN | 101541246 A | 9/2009 |
| JP | 7-36239 U | 7/1995 |
| JP | 9-16326 | 1/1997 |
| JP | 2002-189562 | 7/2002 |
| JP | 2004-171439 | 6/2004 |

OTHER PUBLICATIONS

Combined Office Action and Search Report issued May 22, 2013 in Chinese Patent Application No. 201110081416.7 with English language translation.

* cited by examiner

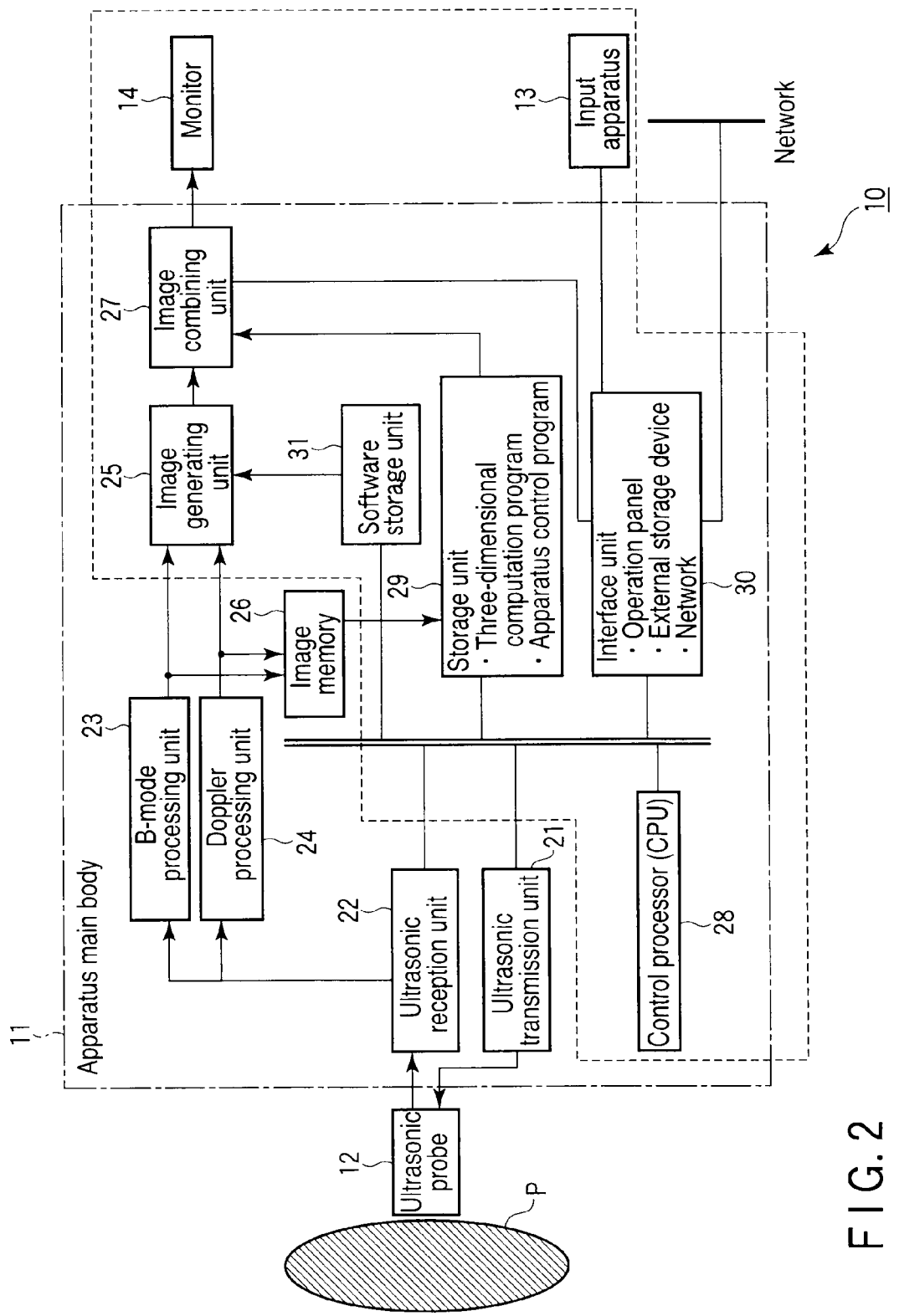
F I G. 2

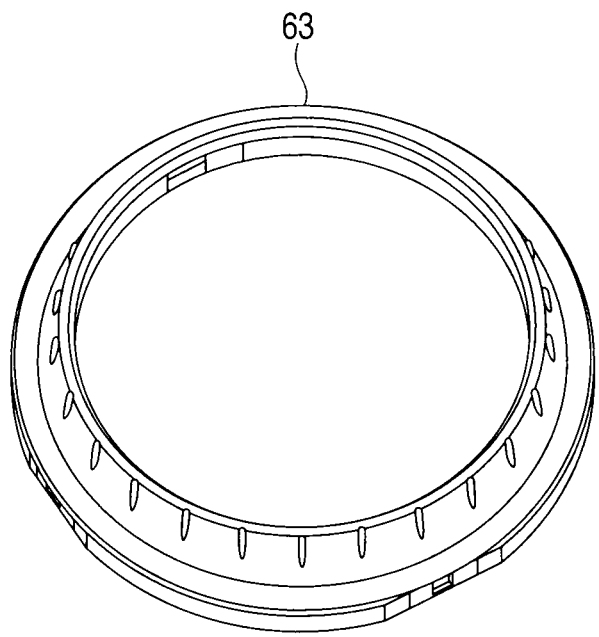
F I G. 5A
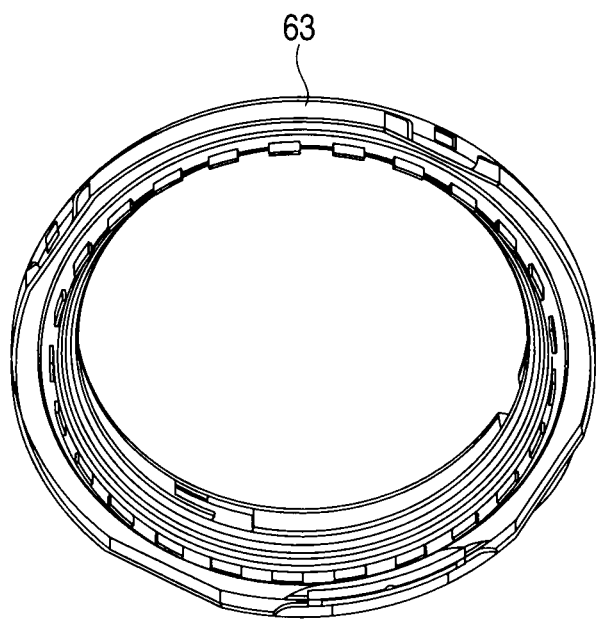
F I G. 5B

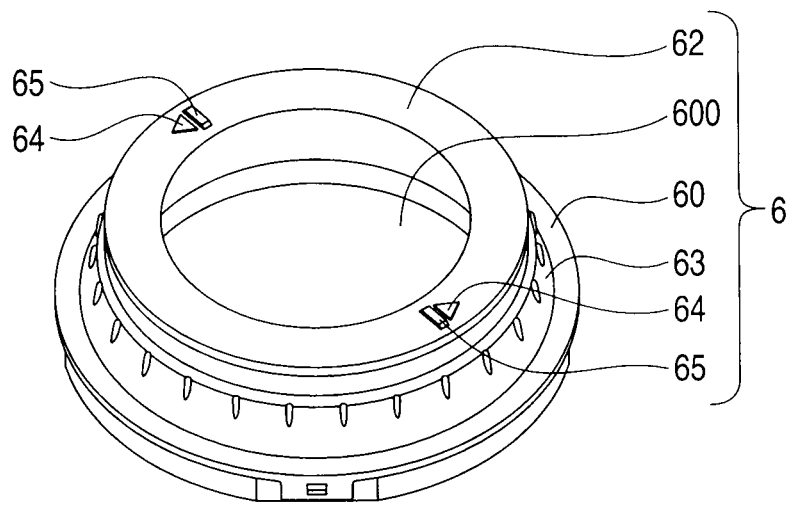
F I G. 11
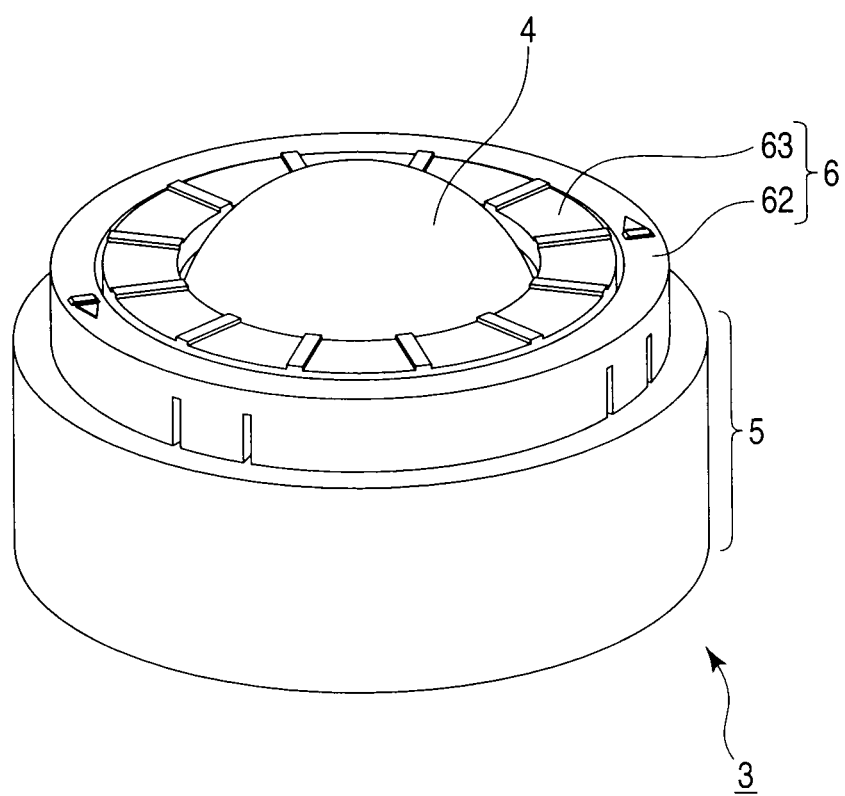
F I G. 13

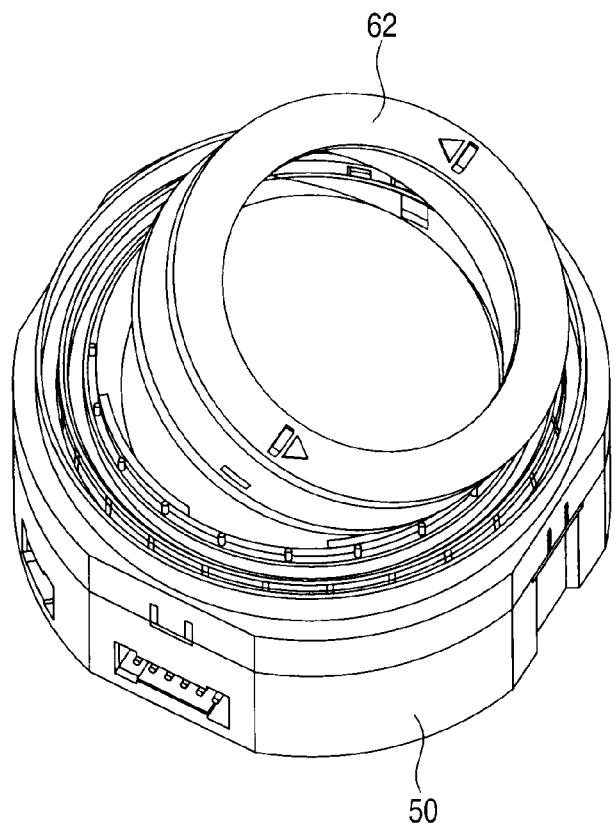
F I G. 12A
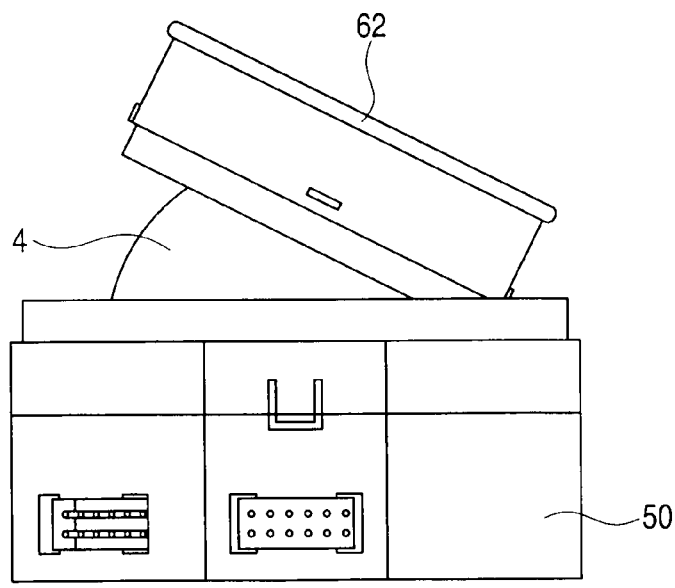
F I G. 12B

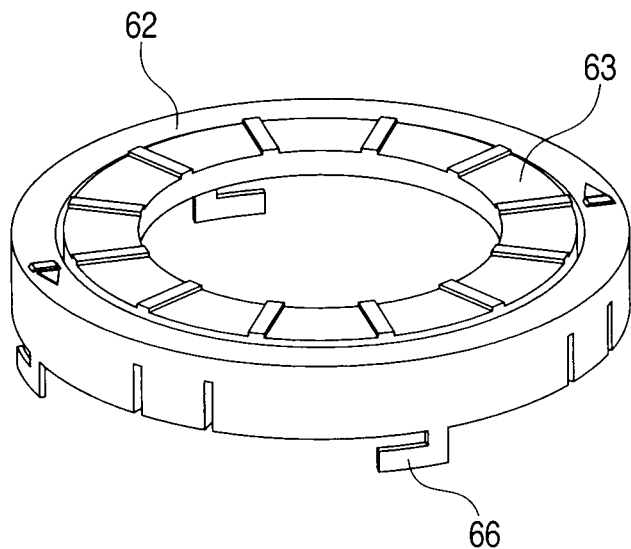
F I G. 15A
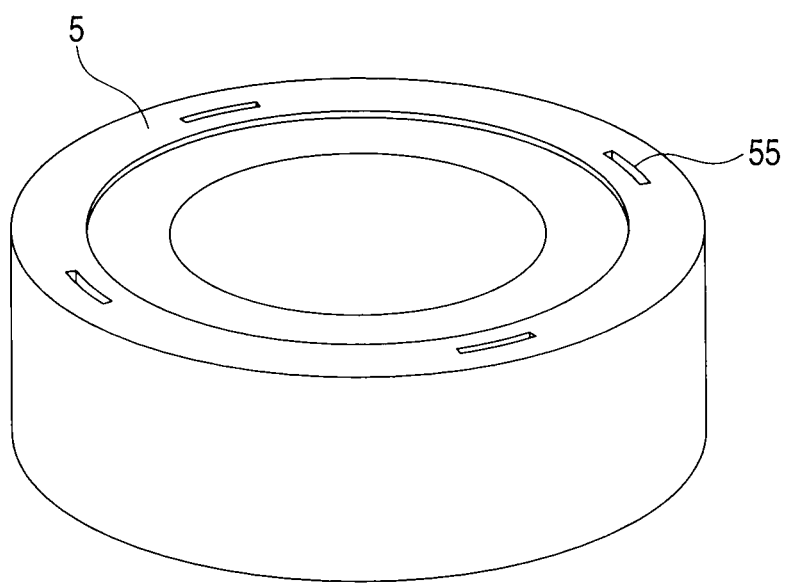
F I G. 15B

_US 9,261,986 B2_

TRACKBALL DEVICE AND ULTRASONIC DIAGNOSTIC APPARATUS

CROSS-REFERENCE TO RELATED APPLICATIONS

This application is based upon and claims the benefit of priority from Japanese Patent Application No. 2010-078802, filed Mar. 30, 2010; the entire contents of which are incorporated herein by reference.

FIELD

Embodiments described herein relate generally to a trackball device and an ultrasonic diagnostic apparatus.

BACKGROUND

A trackball device detects the rotating direction and speed of a ball (sphere) rotated by a user with a pair of orthogonally arranged encoders respectively corresponding to the X- and Y-axis directions, and operates the cursor (pointer) displayed on a screen in accordance with the detected rotating direction and speed. Such a trackball is widely used as the interface unit of a computer typified by a personal computer, a medical image diagnostic apparatus typified by an ultrasonic diagnostic apparatus, and the like.

FIG. 17 is a side view of a trackball device 80 used for an operation panel 90 of a conventional ultrasonic diagnostic apparatus. FIG. 18 is a sectional view of the trackball device 80 shown in FIG. 17. As shown in FIGS. 17 and 18, the conventional trackball device 80 includes a ball 81, a casing 82 having an opening portion to expose part of the ball 81, and a dial 83 used either for operation in an axial direction different from that indicated by the trackball or for control of application software of the ultrasonic diagnostic apparatus. The ball 81 is housed in the casing 82 while being partially exposed from the opening portion and being rotatable. The dial 83 is provided along the opening portion. The user can operate the cursor or the like on the screen by rotating the ball 81 by manually operating the exposed portion of the ball 81 or rotating the dial 83 clockwise or counterclockwise.

In general, the ball 81 tends to become dirty because the user touches it, and dust easily stays in the ball housing portion of the casing 82. Jelly applied to a patient in ultrasonic diagnosis tends to adhere to the trackball device used in an ultrasonic diagnostic apparatus. Such dirt on the ball and dust and the like staying in the ball housing portion cause a deterioration in the detection capability of the trackball. Periodic maintenance and cleaning are therefore indispensable to this device.

However, the conventional trackball device has the following problems at the time of maintenance or cleaning. In order to remove the ball 81 from the ball housing portion of the casing 82, the upper plate of the operation panel 90 of the computer has to be detached, then the trackball device 80 has to be detached from the operation panel 90, and then the trackball device 80 has to be disassembled using specially-designed screws. Therefore, the maintenance or cleaning of the trackball device can be performed only by a professional and requires a great deal of time and labor. Since the user cannot clean the trackball device regularly, the cleaning of the ball and the removal of foreign matter from inside a hole or opening may be delayed. As a result, the detection performance of the trackball may be impaired, and the reliability of the apparatus incorporating the trackball may be deteriorated.

It is intended to provide a trackball device which does not have to be detached from an operation panel and does not have to be maintained or cleaned by a professional, and also to provide an ultrasonic diagnostic apparatus incorporating the trackball device.

BRIEF DESCRIPTION OF THE DRAWINGS

FIG. 2 is a block diagram showing the arrangement of the ultrasonic diagnostic apparatus 1 according to this embodiment;

FIG. 5A is a view showing a dial 63 viewed from the front side, and FIG. 5B is a view showing the dial 63 viewed from the rear side;

FIG. 11 is a view showing an example of the ring 62 raised as a result of threadable engagement or fitting between an upper joining portion 66 and a lower joining portion 55;

FIGS. 12A and 12B are views for explaining how to use the ring 62 as an ejection tool;

FIG. 13 is a view showing a modification of the trackball device 3 having the dial 63 placed outside the ring 62;

FIGS. 15A and 15B are views showing another modification of the shape of the lower joining portion 55 of the first casing 5 and the shape of the upper joining portion 66 of the second casing 6;

DETAILED DESCRIPTION

Figure 1:
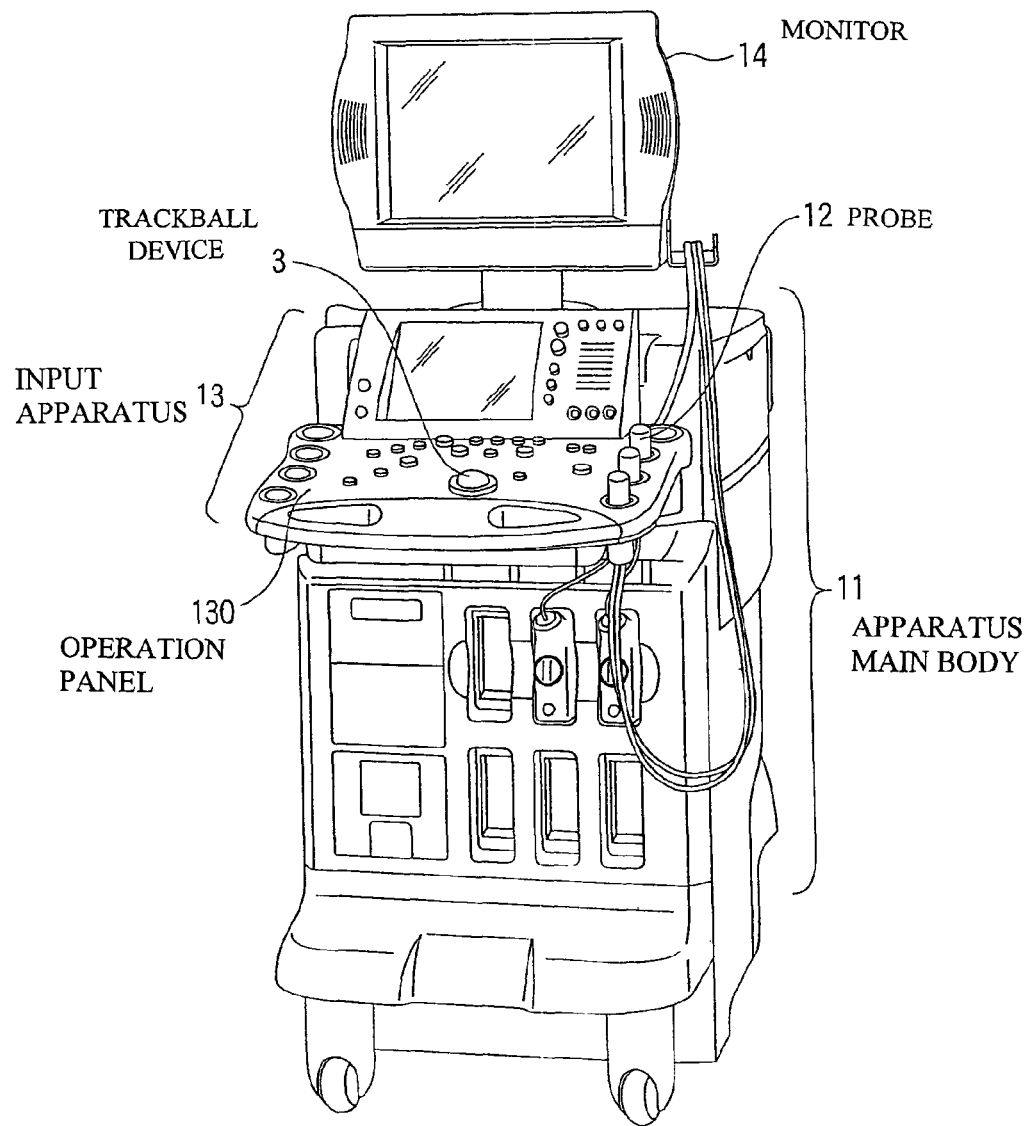
FIG. 1 is a perspective view of an ultrasonic diagnostic apparatus 1 according to an embodiment.

In general, according to one embodiment, there is provided a trackball device provided for an operation panel of a predetermined computer, the device comprising a first casing including a housing portion, a ball rotatably housed in the housing portion, a detector provided in the housing portion and configured to detect input information based on rotation of the ball, and a second casing including an opening portion and mounted on the first casing to restrain the ball in the housing portion while part of the ball is exposed from the opening portion, wherein the second casing further comprises a ring portion which is provided along the opening portion and exposed from the operation panel when the trackball device is provided on the operation panel, and is configured to be detachable from the first casing upon application of a dynamic action to the ring portion.

An embodiment will be described below with reference to the views of the accompanying drawing. Note that the same reference numerals in the following description denote constituent elements having almost the same functions and arrangements, and a repetitive description will be made only when required.

FIG. 1 is a perspective view of an ultrasonic diagnostic apparatus 1 according to this embodiment. FIG. 2 is a block diagram of the arrangement of the ultrasonic diagnostic apparatus 1 according to this embodiment. As shown in FIGS. 1 and 2, the ultrasonic diagnostic apparatus 1 includes an apparatus main body 11, an ultrasonic probe 12, an input apparatus 13, and a monitor 14.

The ultrasonic probe 12 generates ultrasonic waves based on driving signals from the apparatus main body 11, receives reflected waves from an object, and converts the waves into electrical signals (echo signals).

The input apparatus 13 serves to input various kinds of instructions from an operator, instructions to set conditions and a region of interest (ROI), instructions to set various kinds of image quality conditions, and the like to the apparatus main body 11. The input apparatus 13 is connected to the apparatus main body 11, and includes a trackball device 3, various switches, buttons, and a keyboard. As shown in, for example, FIG. 1, the trackball device 3, in particular, is buried in an operation panel 130 of the input apparatus 13 so as to be at least partly exposed from the upper plate of the operation panel 130. The trackball device 3 also has an arrangement that allows cleaning and the like of the ball and the ball housing portion upon ejection of the ball without detaching the upper plate of the operation panel 130. The trackball device will be described in detail later.

The monitor 14 displays morphological information and blood flow information in the living body as images based on video signals from the apparatus main body 11.

The apparatus main body 11 includes an ultrasonic transmission unit 21, an ultrasonic reception unit 22, a B-mode processing unit 23, a Doppler processing unit 24, an image generating unit 25, an image memory 26, an image combining unit 27, a control processor (CPU) 28, a storage unit 29, an interface unit 30, and a software storage unit 31.

The ultrasonic transmission unit 21 applies a driving pulse to the ultrasonic probe 12 at the timing based on a predetermined rate pulse. The ultrasonic reception unit 22 performs the delay processing of giving an echo signal a delay time required to determine reception directivity, addition processing, and the like. The B-mode processing unit 23 receives an echo signal from the ultrasonic reception unit 22, and performs logarithmic amplification, envelope detection processing, and the like for the signal to generate data whose signal intensity is expressed by a luminance level. The Doppler processing unit 24 frequency-analyzes velocity information from the echo signal received from the ultrasonic reception unit 22 to extract a blood flow, tissue, and contrast medium echo component by the Doppler effect. The image generating unit 25 generates an ultrasonic diagnosis image as a display image by converting the scanning line signal string of ultrasonic scanning into a scanning line signal string in a general video format typified by a TV format or the like. The image memory 26 temporarily stores ultrasonic data corresponding to a plurality of frames or a plurality of volumes. The image combining unit 27 combines the image received from the image generating unit 25 with character information of various types of parameters, scale marks, and the like, and outputs the resultant signal as a video signal to the monitor 14. The control processor (CPU) 28 has a function as an information processing apparatus (computer) and controls the operation of the main body of this ultrasonic diagnostic apparatus. In particular, the control processor 28 statically and dynamically controls the operation of the ultrasonic diagnostic apparatus 1 in accordance with instructions from the user input from the trackball device 3. The storage unit 29 stores programs for executing various kinds of scan sequences, image data, and the like. The interface unit 30 is an interface associated with the input apparatus 13, a network, a new external storage device (not shown), network transmission/reception, and the like.

(Trackball Device)

The arrangement of the trackball device 3 which the ultrasonic diagnostic apparatus 1 has will be described in detail next. The trackball device 3 has various functions. For example, applying a dynamic action to the ring portion of the trackball device 3 which is exposed from the operation panel 130 can eject the ball from the trackball device 3. This makes it possible to easily maintain and clean the ball and the ball housing portion without detaching the upper plate or the trackball device 3 from the operation panel 130.

Figure 3:
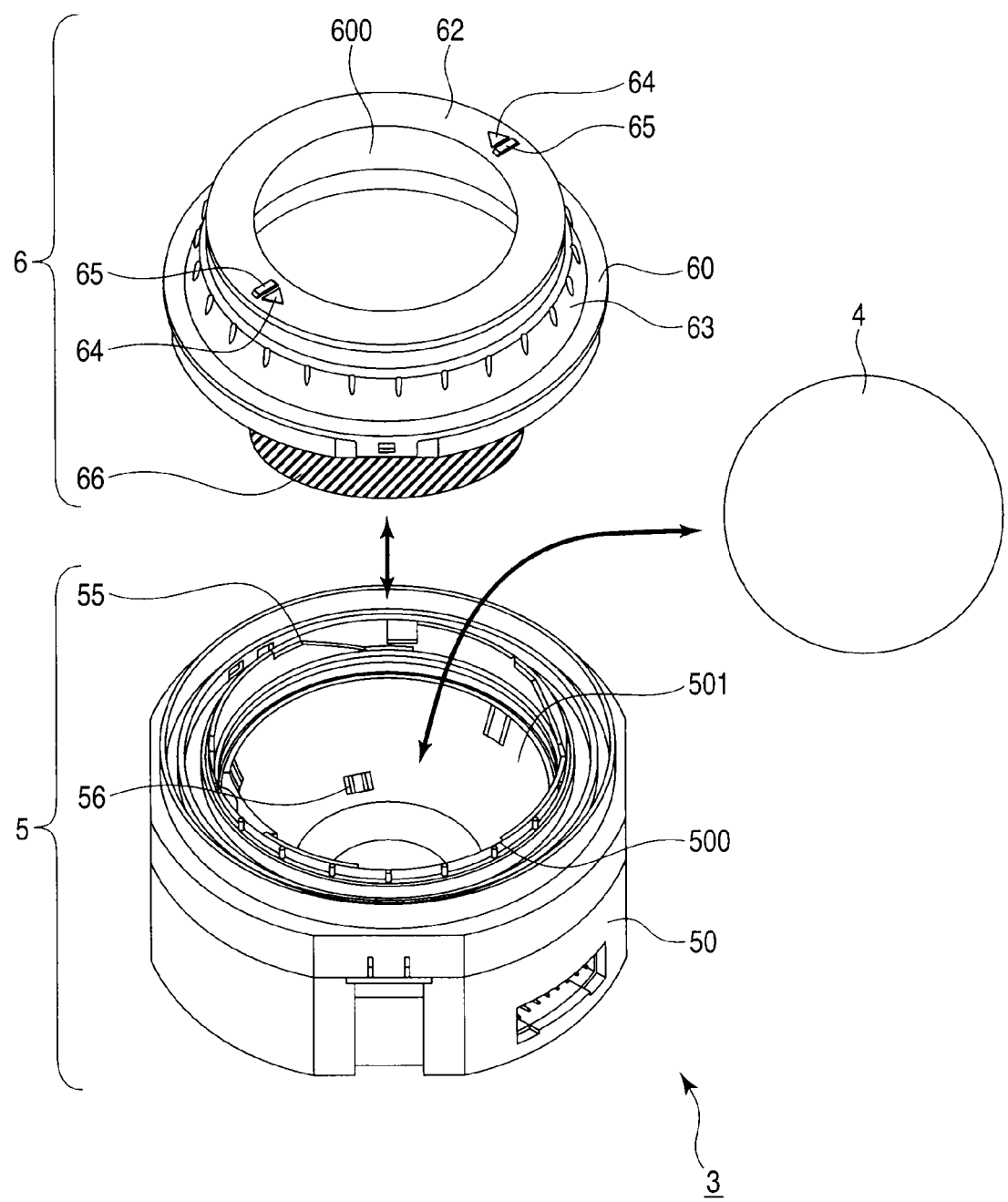
FIG. 3 is an exploded view showing a trackball device 3 according to this embodiment to explain the arrangement of the trackball device 3.
Figure 4:
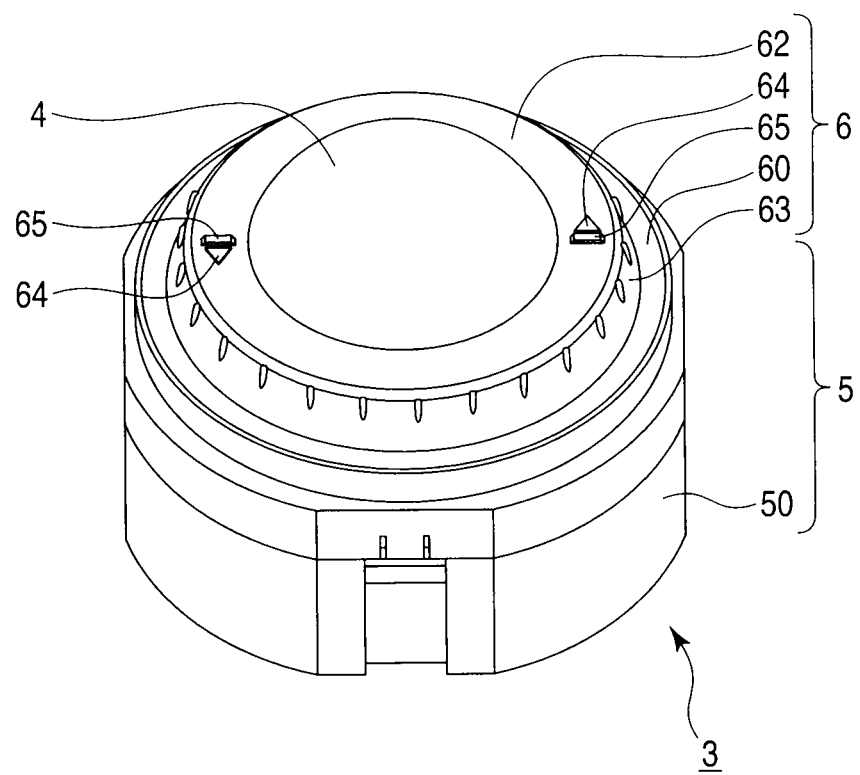
FIG. 4 is a perspective view of the trackball device 3 according to this embodiment.

FIG. 3 is an exploded view showing the trackball device 3 to explain the arrangement of the trackball device 3. FIG. 4 is a perspective view of the trackball device 3. As shown in FIG. 4, the trackball device 3 includes a ball 4, a first casing 5, and a second casing 6.

The ball 4 is a sphere which is housed in the first casing 5 so as to be at least partly exposed and being rotatable.

The first casing 5 includes a lower base portion 50, detectors 56, and a lower joining portion 55.

The lower base portion 50 is a housing which has an almost box-like shape as a whole and includes an opening portion 500 and housing portion 501 in the upper portion.

The housing portion 501 houses the ball 4 while at least part of the ball 4 is exposed from the opening portion 500.

The detectors 56 are, for example, a pair of orthogonally arranged encoders respectively corresponding to the first axial direction (e.g., the X-axis direction) and the second axial direction (e.g., the Y-axis direction) (note that FIG. 3 shows only one detector 56). The detectors 56 detect the rotating direction and speed of the ball 4 housed in the housing portion 501.

The lower joining portion 55 is threadably engaged or fitted with the upper joining portion of the second casing when the second casing 6 is mounted on the first casing 5.

The second casing 6 includes an upper base portion 60, a ring 62, a dial 63, rotating direction marks 64, hook portions 65, and an upper joining portion 66. The second casing 6 is mounted on the first casing 5 while the ring 62 is exposed from the surface of the operation panel 130.

The upper base portion 60 has an opening portion 600 to make at least part of the ball 4 housed in the housing portion 501 be exposed.

The ring 62 is, for example, provided along the opening portion 600 of the upper base portion 60. This arrangement is to prevent the ball 4 housed in the housing portion 501 of the first casing 5 from coming off from the opening portion 500 (to restrain the ball 4 in the housing portion). In addition, the ring 62 has a structure directly or indirectly coupled to the upper joining portion 66. Rotating or vertically moving the ring 62 in a predetermined direction can rotate or vertically move the upper joining portion 66 in the same direction.

The dial 63 is an operation device which is provided, for example, along the outer circumference of the ring 62 so as to be rotatable relative to an upper base portion 60c.

FIG. 5A is a view showing the dial 63 viewed from the front side. FIG. 5B is a view showing the dial 63 viewed from the rear side. Operating (rotating clockwise or counterclockwise) the dial 63 can input an instruction associated with the third axial direction (e.g., the Z-axis direction) different from the first and second axial directions based on the ball 4 by controlling the encoder corresponding to the third axial direction. Alternatively, operating (rotating clockwise or counterclockwise) the dial 63 can input an instruction for changing the gain, in order to control the application software of the ultrasonic diagnostic apparatus.

The dial 63 and the first casing 5 are each provided with a click mechanism for producing a feeling (clicking feeling) similar to that produced when, for example, the user clicks the mouse, when being rotated at the time of operation, in consideration of operability.

Figure 6A:
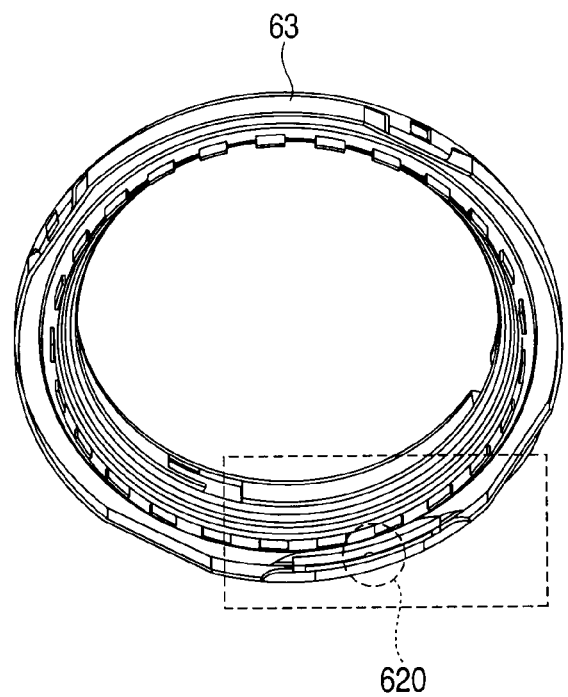
FIGS. 6A and 6B are views for explaining a click mechanism.
Figure 6B:
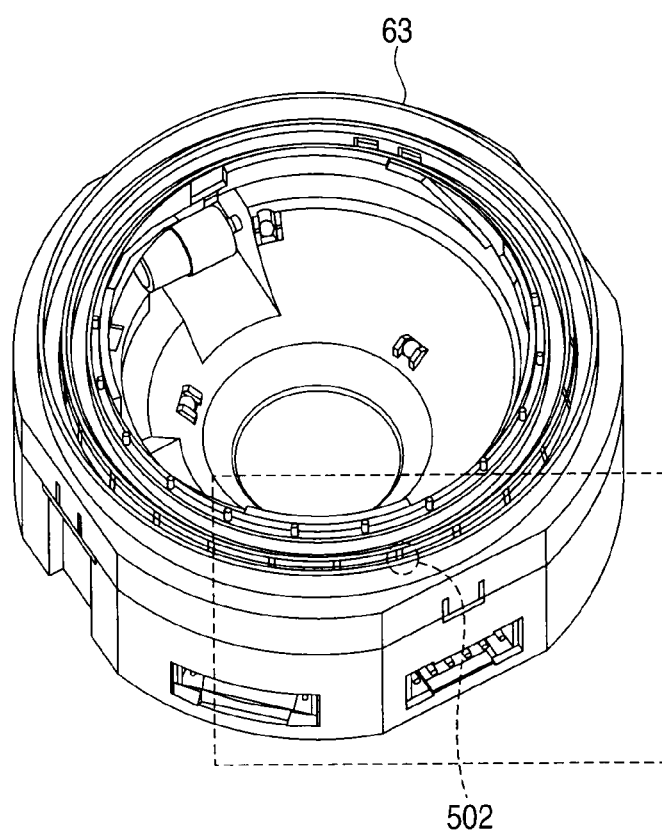
Figure 7A:
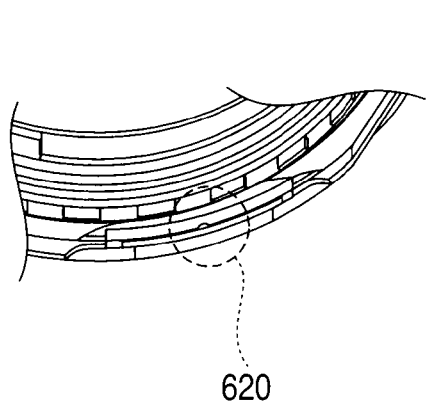
FIG. 7A is an enlarged view of the portion inside the rectangle in FIG. 6A.
Figure 7B:
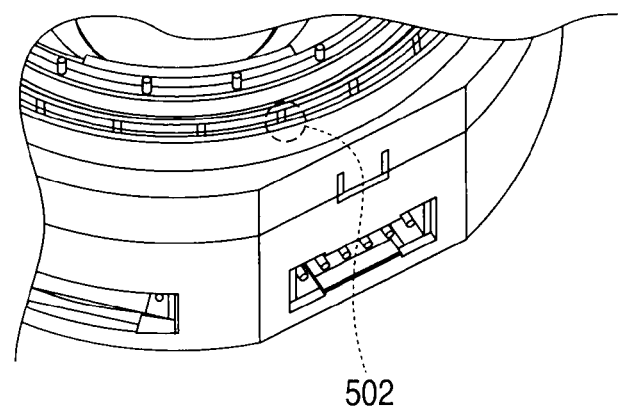
FIG. 7B is an enlarged view of the portion inside the rectangle in FIG. 6B.
Figure 8:
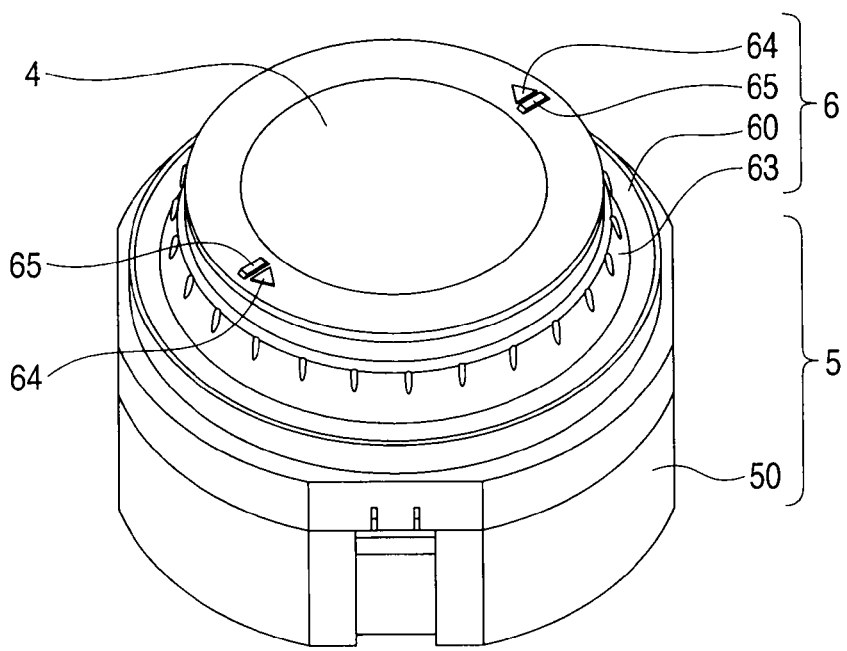
FIG. 8 is a perspective view of the trackball device 3 after a ring 62 is rotated upon application of a dynamic action.

FIGS. 6A and 6B are views for explaining the click mechanism. FIG. 7A is an enlarged view of the portion inside the rectangle in FIG. 6A. FIG. 7B is an enlarged view of the portion inside the rectangle in FIG. 6B.

As shown in FIGS. 6A and 7A, a contact area of the dial 63 with the first casing 5 is provided with an elastic member (e.g., a spring) 620. As shown in FIGS. 6B and 7B, a contact area of the first casing 5 with the dial 63 has recess portions (concave portions) 502 formed along the opening portion 500 at predetermined intervals. The second casing 6 is mounted on the first casing 5 so as to set the elastic member 620 at the same level as that of the recess portions 502. When the user rotates the dial 63, portions of the elastic member 620 are fitted in the recess portions 502. When the user further rotates the dial 63, the fitting state is released. Since the recess portions 502 are formed at the predetermined intervals, such fitting/releasing operation is repeated every time the user rotates the dial 63 through a predetermined angle. The user feels a resistance (load) when periodically repeating such fitting/releasing operation. This allows the user to feel a clicking feeling when rotating the dial 63.

Note that such a mechanism to make the user feel a clicking feeling may be any mechanism which allows the user to feel a predetermined resistance (load) every time he/she rotates the dial 63 through a predetermined angle. For example, the recess portions 502 may be projection portions, and elastic members may be provided on the first casing 5 side while recess portions and the like which are fitted on the elastic members may be provided on the dial 63 side. In addition, the mechanism to be used is not limited to that which produces a resistance by using elastic members and recess/projection portions. For example, it is possible to use a mechanism which produces a resistance by using recess portions and projection portions or projection portions and projection portions.

The rotating direction marks 64 are provided on, for example, the upper surface of the ring 62, and indicate the rotating direction of the ring 62 when the user detaches the second casing 6 from the first casing 5. Note that in this embodiment, the direction indicated by the rotating direction marks 64 is the rotating direction of the ring when the user detaches the second casing 6 from the first casing 5. In contrast to this, it is possible to use an arrangement in which the direction indicated by the rotating direction marks 64 is the rotating direction of the ring when the user mounts the second casing 6 on the first casing 5.

The hook portions 65 are stereoscopically provided on, for example, the upper surface of the ring 62. When the user mounts the second casing 6 on the first casing 5 or detaches the second casing 6 from the first casing 5, the hook portions 65 serve as projection portions on which the user hooks his/her finger or nail.

The upper joining portion 66 has a structure directly or indirectly coupled to the ring 62, and is threadably engaged or fitted with the lower joining portion 55 of the first casing when the user mounts the second casing 6 on the first casing 5. In addition, releasing the threadable engagement or fitting between the upper joining portion 66 and the lower joining portion 55 can detach the second casing 6 from the first casing 5.

The user operates the trackball in the following manner. Part of the ball 4 is exposed from the inside of the ring 62 (its opening portion), as shown in FIG. 4. The user can rotate the ball 4 in a desired direction, at a desired speed, and through a desired angle by manually operating part of the ball 4. The user can input instructions associated with the first and second axial directions by the rotating operation. These instructions are transmitted to the control processor 28 via the interface unit 30. The control processor 28 controls the display position and the like of the cursor displayed on, for example, the monitor 14 based on instructions input by the operation of the ball 4 and dial 63. Likewise, the user can input an instruction associated with the third axial direction (e.g., the Z-axis direction) by operating (rotating clockwise and counterclockwise) the dial 63, in addition to the detection of the first and second axial directions by the ball 4. Alternatively, the user can input an instruction for changing the gain to control the application software of the ultrasonic diagnostic apparatus, by operating (rotating clockwise or counterclockwise) the dial 63.

Figure 9:
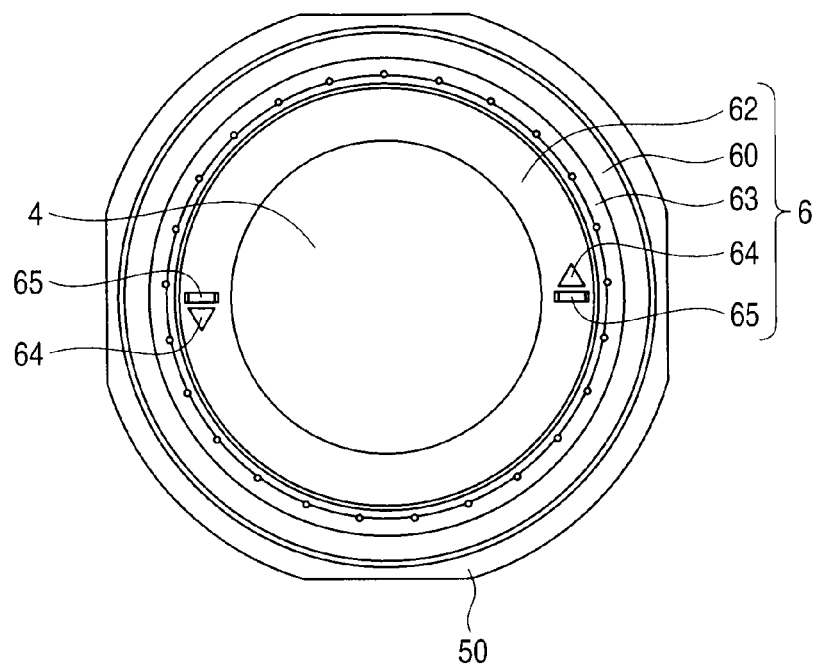
FIG. 9 is a plan view of the trackball device 3 before the ring 62 is rotated upon application of a dynamic action.
Figure 10:
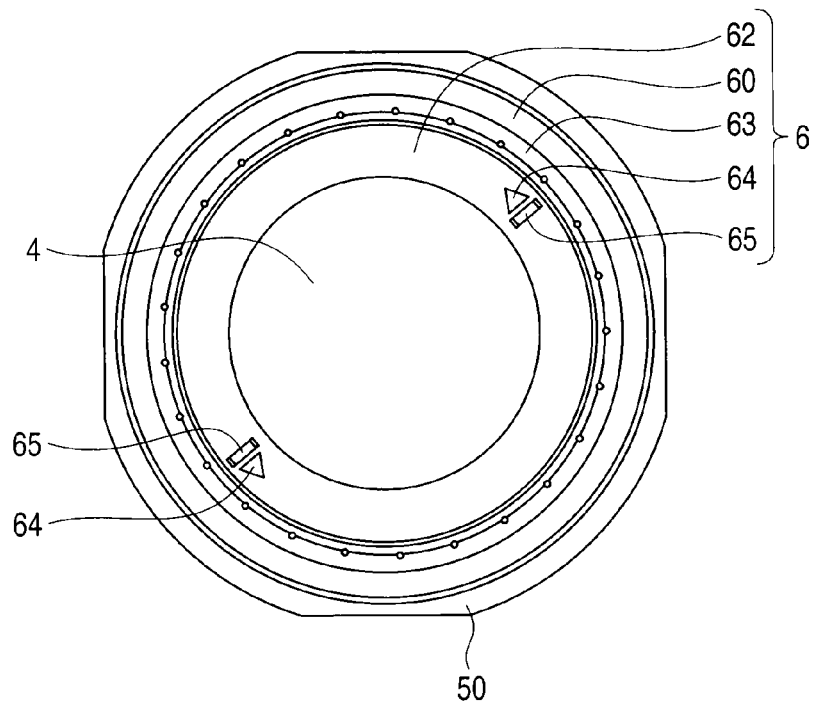
FIG. 10 a plan view of the trackball device 3 after the ring 62 is rotated upon application of a dynamic action.

In the trackball device 3 having the above arrangement, the second casing 6 can be detached from the first casing 5 in the following manner. First of all, as shown in FIG. 9, the user hooks his/her nail or the like on the hook portion 65 and applies a dynamic action to the ring 62 to rotate it by a predetermined number of rotations or through a predetermined angle in the direction indicated by the rotating direction mark 64. With this dynamic action, the ring 62 rotates to shift from, for example, the state shown in FIG. 9 to the state shown in FIG. 10. This rotation releases the engagement or fitting between the upper joining portion 66 and the lower joining portion 55. Finally, the ring 62 shifts to a raised state, as shown in FIG. 11. The user can detach the second casing 6 from the first casing 5 by lifting the raised ring 62, and can eject the ball 4 housed in the housing portion 501 from the opening portion 500. Therefore, the user can detach the second casing 6 from the first casing 5 or eject the ball 4 from the housing portion 501, from the upper plate side of the operation panel 130, without detaching the upper plate or the trackball device 3 from the operation panel 130. This makes it possible to easily clean the ball 4 and the housing portion 501 and maintain the trackball device 3. This arrangement greatly facilitates and simplifies the operation as compared with the conventional arrangement which does not allow cleaning without detaching the trackball from the panel of an electronic device in which the trackball is mounted.

Note that the ring 62 can be detached from the second casing, and can be used as an ejection tool for ejecting the ball 4 from the housing portion 501.

FIGS. 12A and 12B are views for explaining how to use the ring 62 as an ejection tool. As shown in FIGS. 12A and 12B, the user can easily eject the ball 4 from the housing portion 501 by hooking or scooping the ball 4 housed in the housing portion 501 with a side surface of the ring 62.

In the trackball device 3 having the above arrangement, the user can mount the second casing 6 on the first casing 5 by reverse operation to the above detaching operation. That is, first of all, the user houses the ball 4 in the housing portion 501. The user then places the second casing 6 on the first casing 5 so as to match the position of the upper joining portion 66 with that of the lower joining portion 55. The user hooks his/her nail or the like on the hook portion 65 and applies a dynamic action to the ring 62 to rotate it in a direction opposite to that indicated by the rotating direction mark 64 by a predetermined number of rotations or through a predetermined angle. With this series of operations, the user can mount the second casing 6 on the first casing 5.

(First Modification)

The first modification of the trackball device 3 will be described. As shown in FIG. 13, the trackball device 3 according to the first modification has the dial 63 placed inside the ring 62. That is, it is possible to obtain the same effect as that described above regardless of the positional relationship between the dial 63 and the ring 62, that is, regardless of whether any of them is located inside or outside the other.

(Second Modification)

The second modification of the trackball device 3 will be described. The trackball device 3 according to the second modification makes the ring 62 shine to improve the visibility of the trackball device 3 in a dark place. An arrangement for making the ring 62 shine can be implemented by, for example, providing a light guide unit for the upper joining portion 66 and making the light guide unit guide light from an illumination light source provided in the first casing 5 or by forming the ring 62 using a luminous material.

(Third Modification)

Figure 14A:
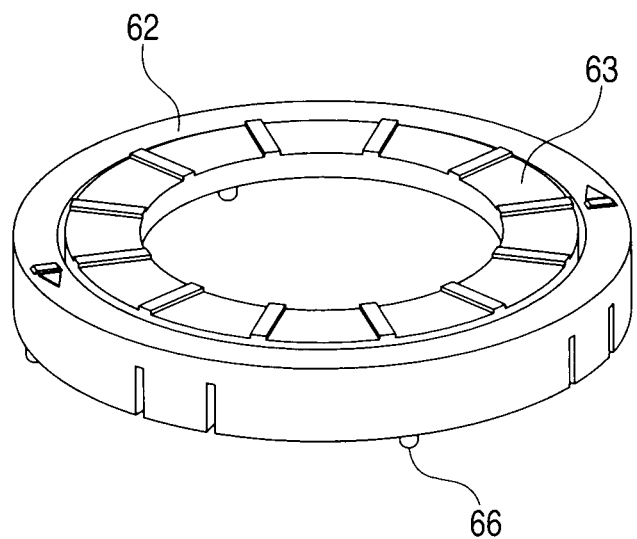
FIGS. 14A and 14B are views showing a modification of the shape of the lower joining portion 55 of a first casing 5 and the shape of the upper joining portion 66 of a second casing 6.
Figure 14B:
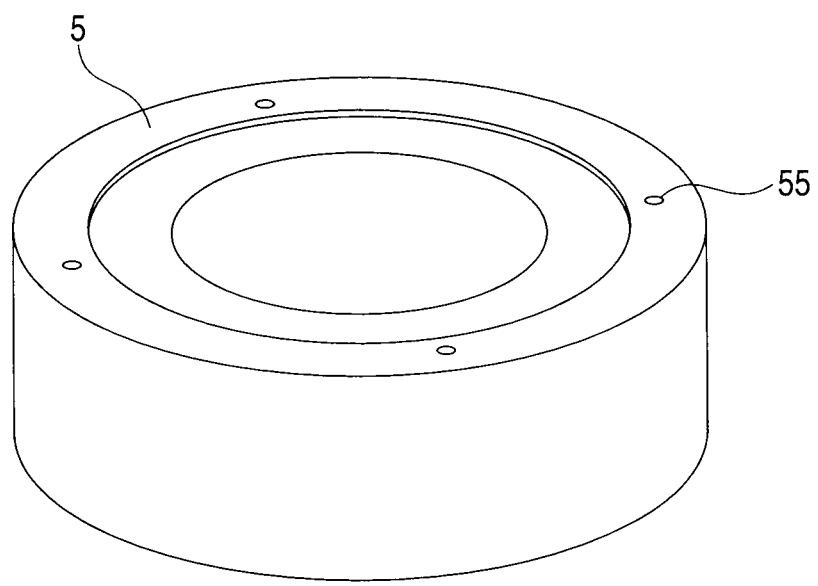

The third modification of the trackball device 3 will be described. As shown in FIGS. 14A and 14B, in the trackball device 3 according to the third modification, one of the lower joining portion 55 of the first casing 5 and the upper joining portion 66 of the second casing 6 is formed into a tenon shape, and the other is formed into a mortise shape (in the case shown in FIGS. 14A and 14B, the upper joining portion 66 is formed into a tenon shape, and the lower joining portion 55 is formed into a mortise shape). Alternatively, as shown in FIGS. 15A and 15B, one of the lower joining portion 55 of the first casing 5 and the upper joining portion 66 of the second casing 6 may be formed into a key shape, and the other may be formed into a key hole shape (in the case shown in FIGS. 15A and 15B, the upper joining portion 66 is formed into a key shape, and the lower joining portion 55 is formed into a key hole shape).

These arrangements can further improve the joining property between the first casing 5 and the second casing 6 and the user-friendliness at the time of attaching/detaching operation.

(Fourth Modification)

Figure 16:
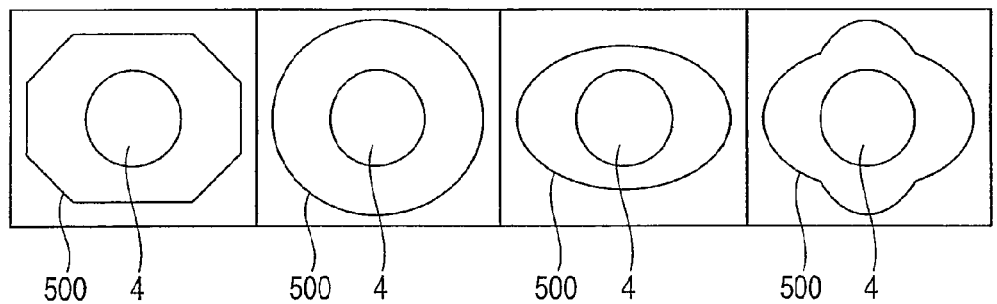
FIG. 16 is a view showing a modification of the shape of an opening portion 500 of the first casing 5.
Figure 17:
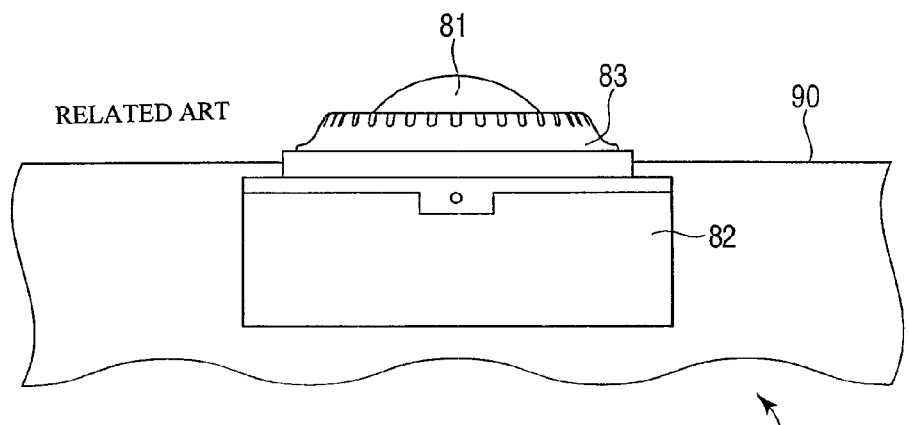
FIG. 17 is a side view of a trackball device 80 used in an operation panel 60 of a conventional ultrasonic diagnostic apparatus.
Figure 18:
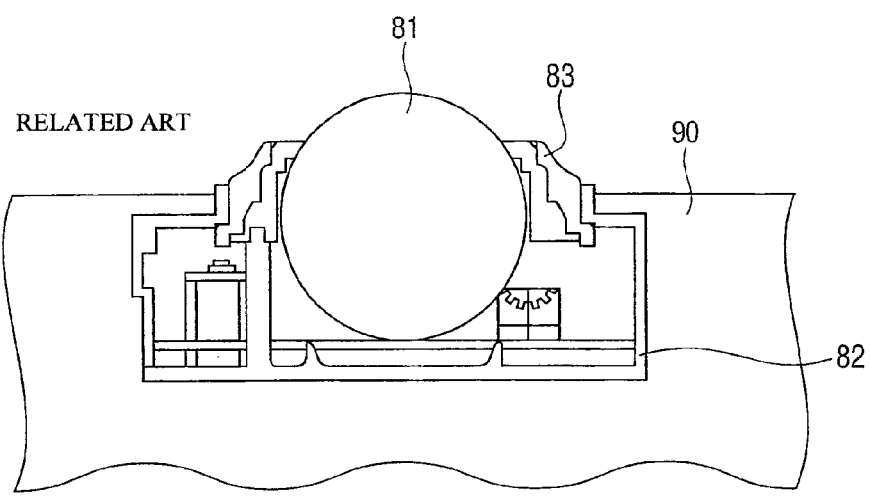
FIG. 18 is a sectional view of the trackball device 80 shown in FIG. 17.

The fourth modification of the trackball device 3 will be described. As shown in FIG. 16, the trackball device 3 according to the fourth modification is configured such that the opening portion 500 of the first casing 5 is formed into an ellipse other than circles, a polygon, or the like. That is, the opening portion 500 may have any shape as long as it allows to eject the ball 4.

The above trackball device and the ultrasonic diagnostic apparatus including the trackball device can implement the following effects. It is possible to release the engagement/fitting between the lower joining portion and the upper joining portion by applying a dynamic action to the ring of the trackball device which is exposed from the operation panel of the ultrasonic diagnostic apparatus or the like. This makes it possible to easily and quickly detach the second casing from the first casing and eject the ball from the housing portion.

The user can keep the apparatus clean by himself/herself by, for example, easily and quickly cleaning the ball and cleaning the housing portion in which the ball is housed and the detector without making an expert detach the upper plate or the trackball device from the operation panel. This makes it possible to prevent a deterioration in the detection capability of the trackball device and a deterioration in the reliability of the ultrasonic diagnostic apparatus or the like which includes the trackball device.

Note that the present configuration is not limited to the above embodiment, and constituent elements can be modified and embodied in the execution stage within the spirit and scope. For example, the above embodiment has exemplified the case in which the trackball device is applied to the ultrasonic diagnostic apparatus. However, the present embodiment is not limited to this, and can be applied to other types of computers, medical image diagnostic apparatuses (an X-ray computed diagnostic apparatus, magnetic resonance imaging apparatus, X-ray diagnostic apparatus, and nuclear medicine diagnostic apparatus), and the like which use a trackball as an input apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A trackball device provided for an operation panel of a medical diagnosis apparatus, the device comprising:
   a first casing including a housing portion, the first casing being fixed to the operation panel;
   a ball rotatably housed in the housing portion;
   a detector provided in the housing portion and configured to detect input information based on rotation of the ball; and
   a second casing including a ring portion and a dial portion, the ring portion configured to keep the ball in the housing portion while the second casing is mounted on the first casing and release the ball from the housing portion when the second casing is detached from the first casing,
   wherein the dial portion is configured to be touched and operated directly by a user to instruct the medical diagnosis apparatus, the dial portion being separable from the ring portion,
   the dial portion is configured to receive input for changing a gain to control application software of the medical diagnosis apparatus, and
   the second casing is detached from the first casing upon direct action to the ring portion along a circumferential direction of the ring portion, the second casing being detachable while keeping the ring portion attached to the dial portion.

2. The device according to claim 1, wherein
   the ring portion includes a first portion;
   the first casing includes a second portion; and
   the first portion is fitted to the second portion when the second casing is housed in the first casing.

3. The device according to claim 2, wherein
   a fitting and a release between the first portion and the second portion is performed in response to a rotational operation of the dial portion.

4. The device according to claim 2, wherein
the first portion is an elastic member; and
the second portion includes a recess portion fitted to the elastic member.

5. The device according to claim 1,
wherein an inner diameter of an opening portion of the ring portion is smaller than a diameter of the ball; and
an outer diameter of an opening portion of the ring portion is larger than the diameter of the ball.

6. The device according to claim 5, wherein the ring portion is formed with a cylindrical form and holdable for the ball with an inner wall.

7. The device according to claim 1, wherein
a fitting between the first casing and the second casing is released by applying the direct action to the ring portion; and
the ring portion is raised with the direct action.

8. The device according to claim 1, wherein
the first casing is threadably engaged with the second casing, and
the threadable engagement is released by applying the direct action to the ring portion.

9. The device according to claim 1, wherein the first casing is fitted with the second casing, and
the fitting is released by applying the direct action to the ring portion.

10. The device according to claim 1, wherein
the second casing includes a rotating direction mark indicating one of a direction in which the direct action is applied to detach the second casing from the first casing and a direction in which the direct action is applied to attach the second casing to the first casing.

11. The device according to claim 1, wherein the second casing comprises a light guide unit configured to guide light from a light emitting unit provided for the first casing or is formed from a luminous material.

12. The device according to claim 1,
wherein an opening shape of the housing portion is circular or polygonal.

13. The device according to claim 1, wherein the second casing further comprises a projection portion to which the direct action is to be applied.

14. The device according to claim 1, wherein the dial portion is configured to communicate an instruction associated with a third axial direction different from first and second axial directions associated with the ball.

15. The device according to claim 1, wherein the ring portion is detachable from the second casing and a part of the ball is exposed from the ring while the ring portion is attached to the second casing and the second casing is attached to the first casing.

16. The device according to claim 1, wherein the dial portion is configured to surround the ring portion surrounding the ball while the second casing is mounted on the first casing.

17. The device according to claim 1, wherein
the first casing includes a lower joining portion;
the second casing includes an upper joining portion; and
the upper joining portion is directly threadable with the lower joining portion when the second casing is mounted on the first casing.

18. A method of detaching a trackball device provided for an operation panel of a medical diagnosis apparatus, the device comprising a first casing including a housing portion, the first casing being fixed to the operation panel, a ball rotatably housed in the housing portion, a detector provided in the housing portion and configured to detect input information based on rotation of the ball, and a second casing including a ring portion and a dial portion, the ring portion configured to keep the ball in the housing portion while the second casing is mounted on the first casing and release the ball from the housing portion when the second casing is detached from the first casing, wherein the dial portion is configured to be touched and operated directly by a user to instruct the medical diagnosis apparatus, the dial portion being separable from the ring portion, and the dial portion is configured to receive input for changing a gain to control application software of the medical diagnosis apparatus, the method comprising:
detaching the second casing from the first casing upon direct action to the ring portion along a circumferential direction of the ring portion, while keeping the ring portion attached to the dial portion.

19. The method according to claim 18, wherein the ring portion includes a first portion, the first casing includes a second portion, and the first portion is fitted to the second portion when the second casing is housed in the first casing.

20. The method according to claim 19, further comprising:
performing a fitting and a release between the first portion and the second portion in response to a rotational operation of the dial portion.

21. The method according to claim 19, wherein the first portion is an elastic member; and
the second portion includes a recess portion fitted to the elastic member.

22. The method according to claim 18, wherein an inner diameter of an opening portion of the ring portion is smaller than a diameter of the ball; and
an outer diameter of an opening portion of the ring portion is larger than the diameter of the ball.

23. The method according to claim 22, wherein the ring portion is formed with a cylindrical form and holdable for the ball with an inner wall.

24. The method according to claim 18, further comprising:
releasing a fitting between the first casing and the second casing by applying the direct action to the ring portion; and
raising the ring portion with the direct action.

25. The method according to claim 18, wherein the first casing is threadably engaged with the second casing, further comprising:
releasing the threadable engagement by applying the direct action to the ring portion.

26. The method according to claim 18, wherein the first casing is fitted with the second casing, further comprising:
releasing the fitting by applying the direct action to the ring portion.

27. The method according to claim 18, wherein the second casing includes a rotating direction mark indicating one of a direction in which the direct action is applied to detach the second casing from the first casing and a direction in which the direct action is applied to attach the second casing to the first casing.

28. The method according to claim 18, wherein the second casing comprises a light guide unit configured to guide light from a light emitting unit provided for the first casing or is formed from a luminous material.

29. The method according to claim 18, wherein an opening shape of the housing portion is circular or polygonal.

30. The method according to claim 18, wherein the second casing further comprises a projection portion to which the direct action is applied.

* * * * *